United States Patent
Baucom et al.

(10) Patent No.: US 11,827,991 B1
(45) Date of Patent: Nov. 28, 2023

(54) ENERGY RECLAMATION AND CARBON-NEUTRAL SYSTEM FOR ULTRA-EFFICIENT EV BATTERY RECYCLING

(71) Applicant: Lyten, Inc., San Jose, CA (US)

(72) Inventors: Jesse Baucom, Sunnyvale, CA (US); Sanjeev Kolli, Santa Clara, CA (US)

(73) Assignee: LYTEN, INC., San Jose, CA (US)

(*) Notice: Subject to any disclaimer, the term of this patent is extended or adjusted under 35 U.S.C. 154(b) by 0 days.

(21) Appl. No.: 17/948,030

(22) Filed: Sep. 19, 2022

(51) Int. Cl.
*H01M 10/0525* (2010.01)
*C25C 1/02* (2006.01)
*C25C 7/02* (2006.01)
*H01M 10/54* (2006.01)

(52) U.S. Cl.
CPC .............. *C25C 1/02* (2013.01); *C25C 7/02* (2013.01); *H01M 10/54* (2013.01)

(58) Field of Classification Search
CPC ............ C25C 1/02; C25C 7/02; H01M 10/54
See application file for complete search history.

(56) References Cited

U.S. PATENT DOCUMENTS

| | | | |
|---|---|---|---|
| 11,371,116 B2 | 6/2022 | Haynes et al. | |
| 2013/0048509 A1 | 2/2013 | Balagopal et al. | |
| 2015/0086837 A1* | 3/2015 | Laramie | H01M 4/622 204/290.03 |
| 2020/0232105 A1 | 7/2020 | Snydacker et al. | |
| 2022/0190437 A1 | 6/2022 | Jang | |
| 2022/0271291 A1* | 8/2022 | Li | H01M 4/38 |

FOREIGN PATENT DOCUMENTS

WO 2021188570 A2 9/2021

OTHER PUBLICATIONS

Mu et al., "Electrochemical lithium recovery from brine with high Mg2+/Li+ ratio using mesoporous ?-MnO2/LiMn2O4 modified 3D graphite felt electrodes," Desalination, vol. 511, Apr. 2021, pp. 1-10.
Wu et al. "Highly efficient and stable Li extraction device by coupling Li4Ti5O12 electrode and matching perfluoro electrolyte," Journal of Alloys and Compounds, vol. 869, 2021, pp. 1-11.
(Continued)

*Primary Examiner* — Zulmariam Mendez
(74) *Attorney, Agent, or Firm* — Zilka-Kotab, P.C.

(57) ABSTRACT

The presently disclosed concepts relate to ultra-efficient EV battery recycling systems. Alkali metal extraction (and in particular lithium extraction) is accomplished using a solid electrolyte membrane. By using a solid electrolyte embedded in a matrix, alkali metals, in particular lithium can be (energy-wise) efficiently separated from feed solutions. The energy used to initially extract lithium from a feed solution is stored as electrochemical energy, which electrochemical energy is reclaimed in subsequent extraction processing steps. This energy storage and energy reclamation is performed in continuous ultra-efficient ongoing cycles. Since irrecoverable energy losses incurred in each cycle are limited to negligible amounts of joule heating of the system components and feed solution, the system can be sustainably powered using locally-generated renewable energy.

18 Claims, 10 Drawing Sheets

(56) References Cited

OTHER PUBLICATIONS

Kazemabad et al., "Crown ether containing polyelectrolyte multilayer membranes for lithium recovery," Journal of Membrane Science, vol. 595, Feb. 1, 2020.

Xu et al., "Materials for lithium recovery from salt lake brine," Journal of Materials Science, vol. 56, 2021, pp. 16-63.

Liu et al., "Study on extraction of lithium from salt lake brine by membrane electrolysis," Desalination, vol. 376, 2015, pp. 35-40.

Diaz Nieto, "Membrane electrolysis for the removal of Mg2+ and Ca2+ from lithium rich brines," Water Research, vol. 154, 2019, pp. 117-124.

Tabelin et al., "Towards a low-carbon society: A review of lithium resource availability, challenges and innovations in mining, extraction and recycling, and future perspectives," Minerals Engineering, vol. 163, 2021, pp. 1-23.

Liu et al., "Lithium Extraction from Seawater through Pulsed Electrochemical Intercalation," Joule, Jul. 15, 2020, pp. 1459-1469.

Baucom et al., U.S. Appl. No. 17/948,055, filed Sep. 19, 2022.

Zhang et al., "Lithium extraction from water lithium resources through green electrochemical-battery approaches: A comprehensive review," Journal of Cleaner Production, vol. 285, 2021, pp. 1-25.

Bruland et al., "6.02—Controls of Trace Metals in Seawater," Treatise on Geochemistry, vol. 6, 2003, pp. 23-47.

Meshram et al., "Extraction of lithium from primary and secondary sources by pre-treatment, leaching and separation: A comprehensive review," Hydrometallurgy, vol. 150, 2014, pp. 192-208.

Munk et al., "Lithium Brines: A Global Perspective," Society of Economic Geologists, Inc., Reviews in Economic Geology, vol. 18, 2016, pp. 339-365.

Olsson et al., "Adsorption and migration of alkali metals (Li, Na, and K) on pristine and defective graphene surfaces," Nanoscale, vol. 11, 2019, pp. 5274-5284.

Yang et al., "Lithium Metal Extraction from Seawater," Joule, Sep. 19, 2018, pp. 1648-1651.

Yu et al., "Ocean Mining: A Fluidic Electrochemical Route for Lithium Extraction from Seawater," ACS Materials Letters, vol. 2, 2020, pp. 1662-1668.

Notice of Allowance from U.S. Appl. No. 17/948,055, dated Aug. 3, 2023.

Non-Final Office Action from U.S. Appl. No. 17/948,055, dated May 3, 2023.

* cited by examiner

ENERGY RECLAMATION AND CARBON-NEUTRAL SYSTEM FOR ULTRA-EFFICIENT EV BATTERY RECYCLING

RELATED APPLICATIONS

The present application incorporates by reference the following application in its entirety for all purposes: U.S. application Ser. No. 17/948,055 entitled "WATER-IMPERMEABLE CARBON-BASED ELECTROLYTE AND SEPARATION MEMBRANE AND FABRICATION THEREOF" filed Sep. 19, 2022.

FIELD OF THE INVENTION

The present invention relates to battery recycling, and more particularly to energy reclamation for ion separation.

BACKGROUND

Currently, various membrane options are used to separate and recover alkali metals. For example, electrolyte membranes may rely on binders to hold the electrolyte membrane together. Alternatively, solid electrolyte particles may be sintered (or otherwise compacted) together into an electrolyte membrane of a desired shape. Further, soft materials may be easily processed into a membrane layer. However, each of these current solutions may result in low ionic conductivity, low durability of the membrane, low scalability, and/or low selectivity for alkali metals.

Additionally, conventional alkali metal extraction systems heavily consume energy (in order to separate out the alkali metal from the feed solution). As worldwide uses of alkali metals, and as worldwide uses of lithium in particular (e.g., for electric vehicle of all types), continues to increase, reliance on conventional metal extraction systems will create an unsustainably increasing demand for ever more energy, as well as a strongly unwanted increase in toxic waste streams (such as lithium extraction/leaching from minerals). Moreover, the production of more and more energy as demanded by these conventional extraction systems adds to greenhouse gas emissions (e.g., by fossil fuel fired electric generation facilities).

As such, there is thus a need for addressing these and/or other issues associated with the prior art.

SUMMARY

A system and method for reclaiming energy are provided. In use, lithium ions are transported from a feed solution to a first electrode through a first membrane comprising a first solid electrolyte embedded in a first matrix, wherein the transporting of the lithium ions from the feed solution to the first electrode requires an input of energy. Additionally, second ions are transported from a second electrode to the feed solution through a second membrane comprising a second solid electrolyte embedded in a second matrix, wherein the transporting of the second ions from the second electrode to the feed solution coincides with the transporting of the lithium ions from the feed solution to the first electrode. Further, the lithium ions are transported from the first electrode to an electrolyte solution through the first membrane, wherein the transporting of the lithium ions from the first electrode to the electrolyte solution recovers at least a portion of the input energy.

In one embodiment, the input of energy may be stored in the form of electrochemical energy of the lithium ions stored in the first electrode. Additionally, recovering the at least a portion of the input of energy reduces a carbon footprint of a manufacturing facility. In some instances, nearly all of the energy inputted to drive the initial separation of lithium from the feed solution may be recovered, and in turn, used to extract lithium from other feed solutions. In this manner, energy may be largely recovered and reused by further ongoing reclamation processes.

Further, the input source for lithium ions (in the feed solution) may be based on at least one of lithium minerals, lithium-containing brines, recycled lithium batteries, or seawater.

The voltage drop may be proportional to a thickness of at least one of the first membrane or the second membrane (assuming that the ohmic resistance of all other, including non-membrane, components of the system is negligible compared to that of the membrane). Additionally, the voltage drop may be proportional to the ohmic resistance of at least one of the first membrane or the second membrane. Thus, a thicker membrane may require more input of energy in order for the alkali metals to fully pass from the feed solution to the first electrode. The input of energy would be equal to the recoverable (e.g., in the form stored electrochemical energy) and irrecoverable energy (e.g., heat).

Additionally, each of the lithium ions may pass through a single particle of the first solid electrolyte of the first membrane. In this manner, the transporting of the lithium ions through a single particle may increase efficiencies in ion-transport (as it doesn't have to pass through multiple particles).

The first membrane and the second membrane may each be water impermeable. Further, the first membrane may be ion-selective for the lithium ions, and in similar manner, the second membrane may be ion-selective for the second ions. The second ions may include at least one of sodium, potassium, or hydrogen. It is to be appreciated that any ion which is less reducing than lithium (or the ion to be extracted) may be used as the second ions. Of course, it is to be appreciated that using an ion less reducing than lithium may not be a requirement for the second membrane.

Still yet, transporting the lithium ions from the first electrode into the electrolyte solution through the first solid electrolyte may coincide with an uptake of the second ions from the electrolyte solution into the second electrode through the second solid electrolyte. In this manner, as lithium ions are transported from the feed solution to the first electrode, the second ions are transported from the second electrode to the feed solution. Additionally, when lithium ions are transported from the first electrode to the electrolyte solution, the second ions may be transported from the electrolyte solution to the second electrode. It is to be appreciated that a first group of second ions may be associated with the transporting of the second ions from the second electrode to the feed solution, and a second group of second ions may be associated with the transporting of the second ions from the electrolyte solution to the second electrode.

In one embodiment, the first solid electrolyte may be at least one of: LATP, LZP, LAGP, LiSICON, or LTO; and the second solid electrolyte is at least one of NaSICON or $K_2Fe_4O_7$.

Additionally, the first membrane may serve as an electrical buffer between the first electrode and at least one of the feed solution or the electrolyte solution, and the second membrane may serve likewise as an electrical buffer between the second electrode and at least one of the feed solution or the electrolyte solution.

Further, a diameter of the first solid electrolyte may be at least 10 μm (microns), and a material for the first matrix and the second matrix may be the same, or may be configured to be different.

DETAILED DESCRIPTION

Figure 1A:
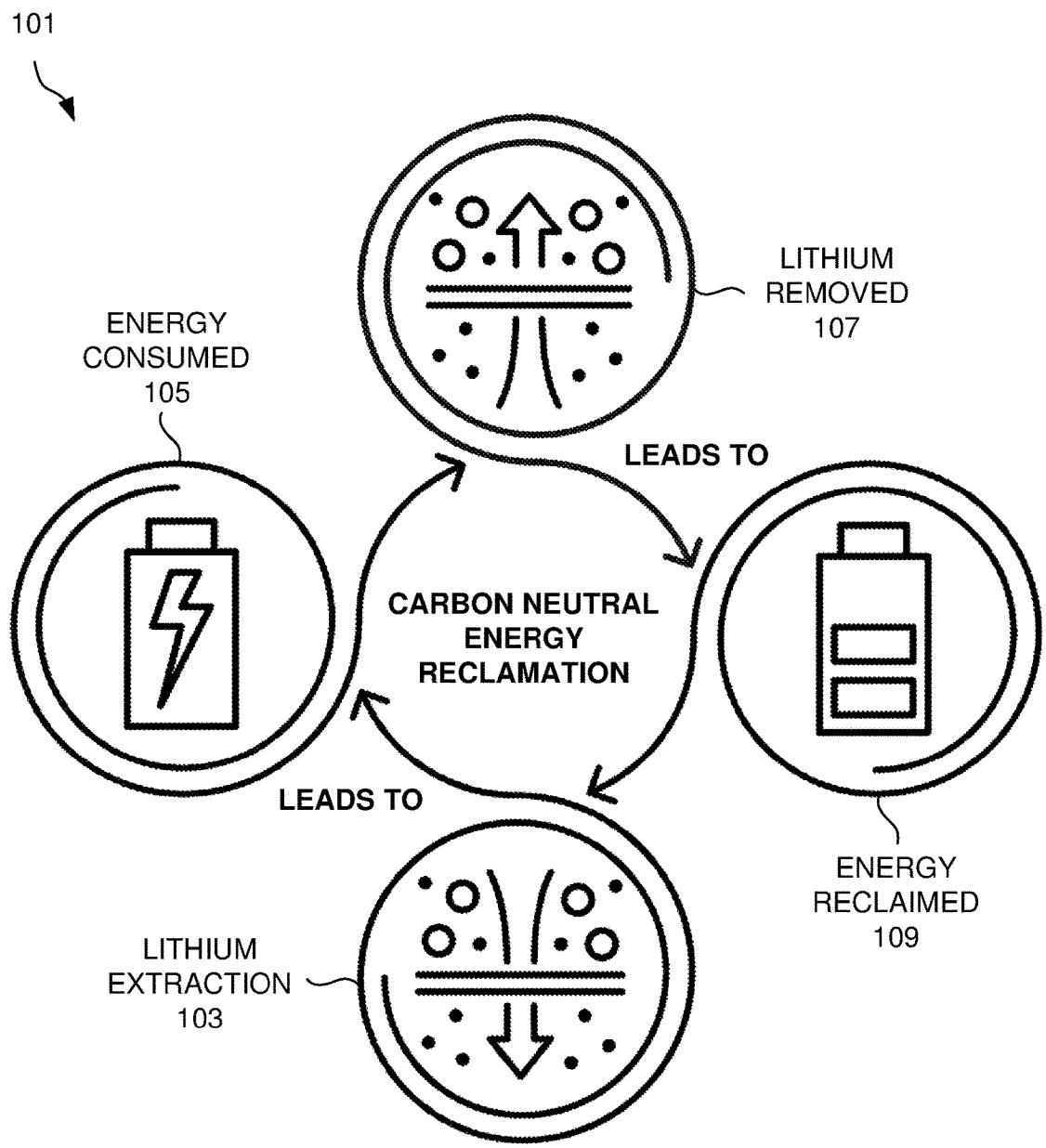
FIG. 1A illustrates a system and method for a carbon-neutral energy reclamation battery recycling, in accordance with one embodiment.

Lithium has become ubiquitous in nearly all electric or electronic products, from batteries to armor plating, from to bicycle frames to glass, from lubricants to ceramics and more. Conventional systems and methods for obtaining lithium extract the lithium from raw materials such as from rocks and/or from mineral springs. It is well known that the global demand for lithium will deplete all known commercially viable sources of such raw materials. It therefore becomes imperative to recycle lithium. One source of lithium that is a candidate for recycling is from used lithium-containing batteries. However, to be sustainable, the techniques for lithium extraction must be highly energy efficient and scalable.

The present description relates not only to extraction methods for lithium, but additionally to how to recover energy spent to extract the lithium. In use, extracting lithium ions from a feed solution using a membrane having a solid electrolyte may cause a voltage drop. The extracted lithium ions may be stored on an electrode. When needed, the lithium ions can then be transferred from the electrode, which in turn, may cause a discharge of the energy stored. In this manner, the extraction, storage, and discharge steps correspond with a typical anode and cathode assembly, and the typical charging/discharging of energy based on the flow of ions.

Additionally, reclamation techniques disclosed herein are scalable so as to be able to meet the forecasted worldwide EV battery recycling demands through this decade and into the decades to follow. To illustrate the needed scale, it is estimated that 10 TWh of EV battery capacity will be demanded between now and the beginning of 2030, with over 1 TWh being demanded in calendar year 2025 alone. This demand, in turn, may require around 125,000 tons (or more) of lithium for EV batteries each year. It is acknowledged that a substantial high percentage of this lithium tonnage can be reclaimed from spent batteries.

In view of this large scale, a primary challenge is reclamation efficiency. The techniques disclosed herein meet this challenge by implementing energy recycling, resulting in an extremely low demand for energy needed to accomplish the lithium reclamation. For example, for a single factory that reclaims 500 tons of lithium per year, using the energy reclamation techniques disclosed herein, a continuous power demand of only 44 KW may be required (a number that is small enough to be provided by banks of solar panels that fit on the roof-space of an EV battery factory). As such, the disclosure herein not only provides for more efficient separation of lithium from feed solution, but additionally provides for significant energy reclamation associated with the lithium extraction.

As such, based on the ability to recover energy spent (to extract) through the discharging of ions may allow for a near carbon-neutral system for ultra-efficient electric battery recycling. As demand for lithium continues to increase, the need to recycle and recover lithium sustainably from pre-existing lithium-containing items will likewise increase. Additionally, with the push for more green energy, the present description provides for recovery of a substantial fraction of energy spent for extracting lithium ions, which in turn results in an environmentally prudent and responsible alternative to known methods and systems.

Additionally, known separation membranes often will crack and fail as time goes on, resulting in both time inefficiencies and fiscal losses (in having to replace the electrolyte). Further, other membranes (e.g. adsorption membranes, etc.) may have membrane fouling, which in turn, may decrease the efficiency and lifetime of the membrane. The membrane disclosed herein, in contrast, is bound in a stable matrix that does not suffer from (or have much less of) membrane fouling or membrane cracking (e.g., as a consequence of volume expansion during extraction, etc.), which in turn, increases longevity of the electrolyte and the membrane, thereby overcoming said inefficiencies and losses.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Within the context of the present description, the term "membrane" shall be understood as referring to a barrier or lining which separates a solution from a filtrate. The solution may include any feed material/solution, and the filtrate may include that which has been filtered by the membrane. Further, a solid electrolyte (which may be embedded within the membrane) may refer to a solid-form electrolyte capable of migrating ions. Additionally, a matrix may include and/or refer to, an epoxy, a polymer matrix, any polymeric binder, a multifunctional amine, and/or a multifunctional epoxide. In this manner, a matrix may provide mechanical strength required to keep a film intact over the life of its operation, including preventing cracks from forming when a membrane is removed from water (or any other feed solution), and acting as a barrier.

Within the context of the present description, the term "electrode" refers to an electric conductor. The electrode may compose an active material which may serve as a host for extracted ions (such as lithium) and store the energy input for extraction in the form of electrochemical energy.

Descriptions of Exemplary Embodiments

FIG. 1A illustrates a system and method 101 for a carbon-neutral energy reclamation battery recycling, in accordance with one embodiment. As an option, the system and method 101 may be implemented in the context of any one or more of the embodiments set forth in any previous and/or subsequent figure(s) and/or description thereof. Of course, however, the system and method 101 may be implemented in the context of any desired environment. Further, the aforementioned definitions may equally apply to the description below.

FIG. 1A is being presented to illustrate a virtuous cycle that encompasses sustainability of both lithium extraction as well as sustainability of energy reclamation.

As shown, the system and method 101 includes extracting lithium (step 103). The extraction of lithium may occur using a solid electrolyte membrane (such as the solid electrolyte membrane 100, detailed herein). In extracting the lithium, energy may be consumed (step 105).

In one embodiment, a voltage drop (such as the voltage drop 612 due to transporting of lithium ions) may be due to ohmic resistance ($V=IR$). Since I (or desired current I) is generally dictated by a desired extraction rate of Li, an extractor may be configured to minimize R in order to result in the lowest voltage drop V (corresponding to, for example, unreclaimable electricity). Since resistance is proportional to the membrane thickness and inversely proportional to conductivity, the system may be constructed to use charge-conducting components (e.g. such as the Li+ extraction membrane) with minimal thickness and maximum conductivity.

The lithium ions that are extracted are stored on an electrode. When the energy is needed, a second electrolyte may be used to facilitate the removal and transfer of lithium ions from the electrode (step 107). In removing and transferring the lithium ions from the electrode, energy may be reclaimed (step 109).

In operation, therefore, lithium may be extracted from a feed solution using a first membrane, stored on an electrode, and then transferred out using an electrolyte solution. The energy required to extract the lithium ions from the feed solution may be recovered when the lithium ions are transferred from the electrode. Once the lithium ions are transferred out (to the electrolyte solution), the lithium ions may be in the form of lithium carbonate (or an equivalent thereof). In operation, as the lithium is extracted (per step 103), it may be removed from the feed solution and stored on the electrode. As lithium ions are transported from the feed solution, they may be, in turn, replaced with other ions (such as sodium) which may be transported from a second electrode, through a second membrane and into the feed solution. At a later time, the feed solution may be removed and replaced with an electrolyte solution. For example, in various embodiments, the membrane may be physically removed from the feed solution (like a sponge is removed from a bath), or the membrane may be immersed in a tank containing the electrolyte solution (where the electrolyte solutions can be pumped in/out to change the electrolyte solution.

The lithium ions stored on the electrode may then be transported from the electrode to the electrolyte solution. This removal of lithium ions (and transporting of them via the membrane) may cause an energy release which may be reclaimed (via an external battery, for example). In other words, the energy stored in the form of electrochemical energy of the extracted lithium may be reclaimed upon removal of the lithium. As lithium ions move from the electrode to the electrolyte solution, another ion (such as sodium) present in the electrolyte solution may transfer (via the second membrane) to the second electrode. In this manner, as lithium is transported to the electrode, energy may be consumed, and as lithium is transferred from the electrode, energy may be released. This release of energy may, in turn, be used to provide most of the input energy needed for the lithium extraction (via the lithium extraction step 103 and the energy consumed step 105).

As such, therefore, the operation of extracting the lithium ions, storing, and then discharging mimics energy charge and discharge cycles of a battery, which in turn, may provide high energy efficiency (due to the recovery of energy inputted).

With respect to the feed solution, previously used and spent batteries may be added to the aqueous solution, and may be the basis from which the lithium ions may be extracted. If it were desired to have greater selectivity (for example of lithium ions), the first membrane (used to extract the lithium ions) may be thickened. To clarify, a thicker membrane may have lower permeation (rate of diffusion through) of water by virtue of a longer distance that the water may need to travel through. As such, a thicker membrane may have a higher selectivity for Li+ uptake via electrodialysis over water uptake via diffusion. Additionally, in one embodiment, the greater the thickness, the greater the voltage drop as well. In other words, the voltage drop may scale linearly with thickness, since resistance scales linearly with thickness.

For example, the first membrane may be tuned to the ion that is to pass through it. In this manner, the membrane may be tuned such that a larger ion, for example, may pass through a first membrane layer, and a smaller ion, for example, may pass through a second membrane layer. For example, a solid electrolyte material may be selected whose crystal structures have inherent selectivity for the desired ion. The ease at which a specific ion may pass through the solid electrolyte material may depend on the amount of energy it takes for ions to "hop" through different sites of the crystal lattice. Ions that are too large or too small will require more energy to hop from site to site. As such, for any given solid electrolyte structure, an "optimal" ion size with the lowest activation energy (and therefore the highest ionic conductivity and selectivity over other ions) may be tuned to the particular solid electrolyte structure. In this manner, a structure of the crystal lattice (of the solid electrolyte) may be tuned for a specific ion (where if the activation energy is too high, it simply will not pass through the membrane, or it will pass through in small or insignificant quantities.

Figure 1B:
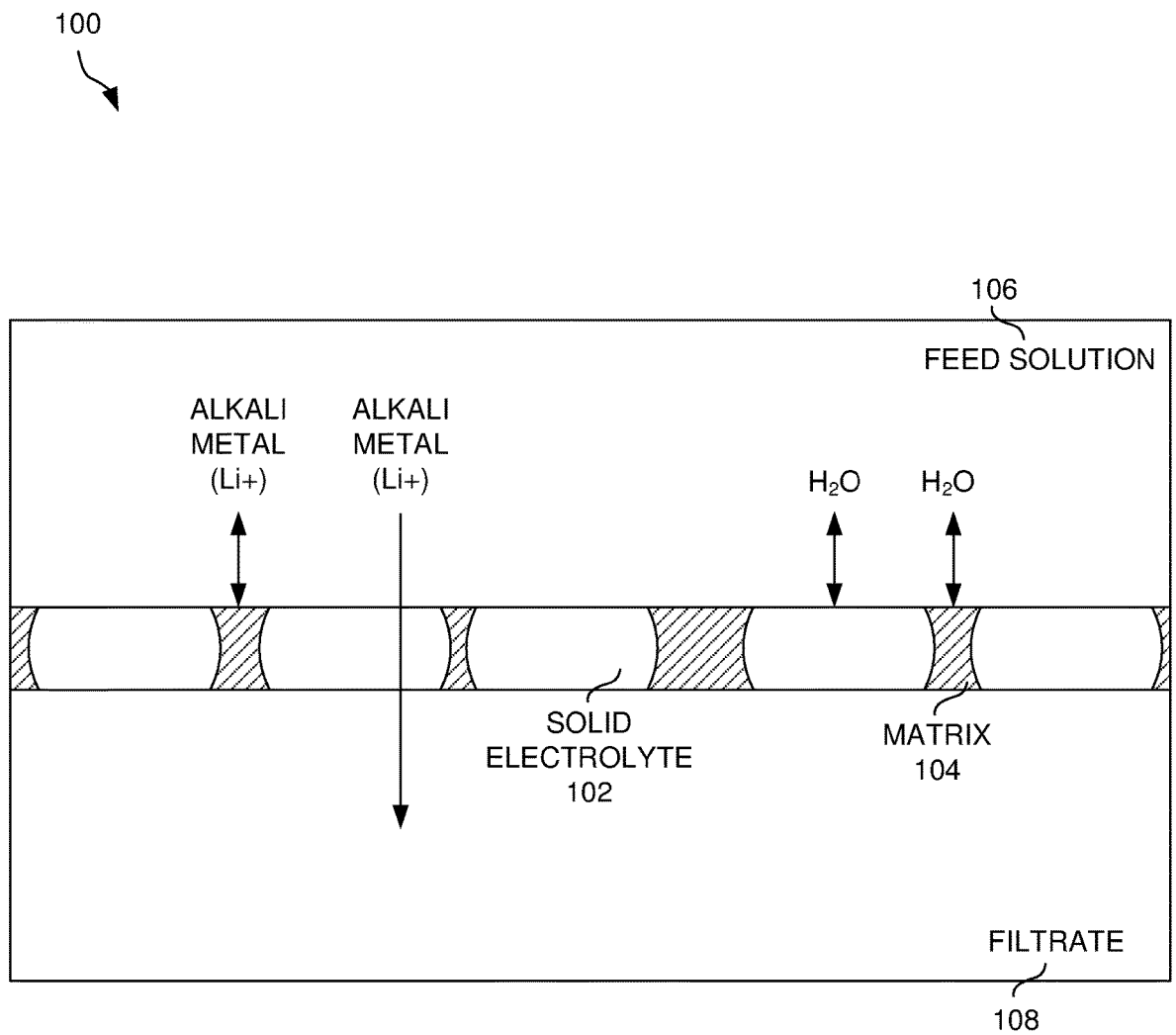
FIG. 1B illustrates a solid electrolyte membrane, in accordance with one embodiment.

FIG. 1B illustrates a solid electrolyte membrane 100, in accordance with one embodiment. As an option, the solid electrolyte membrane 100 may be implemented in the context of any one or more of the embodiments set forth in any previous and/or subsequent figure(s) and/or description thereof. Of course, however, the solid electrolyte membrane 100 may be implemented in the context of any desired environment. Further, the aforementioned definitions may equally apply to the description below.

In the context of the present description, the solid electrolyte membrane 100 may be used to enable the passage of Li+ (or any preconfigured alkali metal) ions while preventing all other unwanted substances, such as water, from passing through the solid electrolyte, or through a substrate in which the solid electrolyte is embedded. Additionally, the structure of the solid electrolyte membrane 100 is extremely durable, enabling operation for a significant time without structural degradation or decrease in performance.

Of course, it is to be appreciated that the solid electrolyte membrane 100 could be configured to allow passage of any specific ion. Further, the solid electrolyte membrane 100 may be configured for a high selectivity ratio of ions (such as Na+/Li+, Na+/K+, etc.).

The solid electrolyte membrane 100 improves and solves problems previously associated with prior selective membrane. For example, when using the solid electrolyte membrane 100 as an ion-selective membrane for electrochemical lithium extraction/recycling, it may prevent the electrode from contacting water (which may adversely react with it). Further, the ion-selective membrane may prevent the electrode active material from needing to be directly soaked in the feed solution, which would cause the electrode to dry out, which in turn may lead to cracking when removed from the solution while making the electrode material vulnerable to the contents of the feed solution. Additionally, the ion-selective membrane may resist cracking when taken out of the feed solution due to the fact that the ion-selective membrane may be held together by a densely crosslinked matrix, which may prevent a reconfiguration of the polymer structure (which may occur when a liquid with high surface tension, such as water, is removed from the ion-selective membrane, etc.).

Further, the solid electrolyte membrane 100 may be used as a polysulfide barrier, which may attenuate or remove (even near completely) the poly sulfide shuttle phenomena in Li—S batteries. Still yet, the solid electrolyte membrane 100 may protect Li metal (or any alkali metal) from air, enabling the use of Li-air batteries, which have the highest specific energy of any known chemistry for lithium-ion batteries. As such, the solid electrolyte membrane 100 may be used as a conductive barrier to air.

As shown, a solid electrolyte 102 is embedded in an matrix 104. In one embodiment, the solid electrolyte 102 may be embedded in aluminized mylar. The combination of the solid electrolyte 102 and the matrix 104 represents a membrane. In one embodiment, as illustrated, feed solution 106 may include an alkali metal (such as Lit) and a liquid (such as water, $H_2O$). The membrane may be water impermeable such that the water may be prevented from crossing the solid electrolyte 102 and the matrix 104. In contrast, the alkali metal (such as Lit) may not pass thorough the matrix 104 but may pass through the solid electrolyte 102. That which passes through the membrane may be found in the filtrate 108. Additionally, in addition to repelling water, the membrane may also repel polysulfides, air (including but not limited to oxygen, nitrogen, carbon dioxide, etc.), etc.

The membrane may be composed of solid electrolyte particles (shown as the solid electrolyte 102) within a dense matrix (shown as the matrix 104). Each individual solid electrolyte particle may completely traverse the membrane such that a Li+ ion (or any alkali metal ion) entering from one side of the membrane enters the membrane through the same solid electrolyte particle that it exits the membrane from (i.e. it does not need to pass through any solid-solid interface). In one embodiment, completely traversing the membrane as a single particle may allow for higher conductivity, as the transport pathway may be more direct (especially compared to Li+ transport pathways that go through many solid-solid interfaces which may in turn have lower Li+ conductivity).

In one embodiment, the solid electrolyte membrane 102 may also prevent water from passing through the space in between the solid electrolyte particles and the matrix 104. In one embodiment, this may be due to the fact that the matrix 104 may interact strongly with the solid electrolyte particles of the solid electrolyte 102. Additionally, the solid electrolyte particles of the solid electrolyte 102 may be functionalized to improve interactions with the matrix 104. For example, in one embodiment, if using the solid electrolyte LATP, which is rich in phosphates, acrylic acid derivatives (such as 2-(aminoethyl)methacrylate) may be used to react with the surface phosphates (via michael addition) in order to enrich the surface of the solid electrolyte 102 with amine groups. As such, the epoxide molecules from the matrix 104 may covalently bond with the solid electrolyte particles of the solid electrolyte 102.

Although the alkali metal is shown as Li+ in the solid electrolyte membrane 100, it is to be appreciated that any ion of choice can be selected. Depending on the ion that should be separated, the solid electrolyte may be replaced with the appropriate material. For example, in one embodiment, if Na+ separation is desired, then NASICON can be used in place of LiSICON as the solid electrolyte. Of course, it is to be appreciated that any other ions (such as K+, Rb+, Cs+, etc.) may be separated based on accompanying solid electrolyte materials. Further, it is to be appreciated that LiSICON is a member of the NASICON family of solids, which is composed of ZrO6 octahedra and PO4/SiO4 tetrahedra that share common corners, with Na+ in the interstitial space. LiSICON may have a structural analogue with MO6 (M=Ti, Ge, Zr, Hf, Sn) octahedra and PO4 tetrahedra and Li+ in the interstitial sites. Such solid electrolytes may have high resistance to degradation and/or corrosion in water. It is to be appreciated that other materials may likewise work (that provide resistance to degradation and/or corrosion in water).

Additionally, the process can be tuned such that any desired volume fraction of solid electrolyte particles within the matrix can be achieved. For example, a slurry may be cast in which all particles are the same size and are hexagonally close packed such that the volume fraction of particles in the casted membrane is maximized. For example, maximizing the volume fraction may include maximizing the volume for a particular given particle size distribution. In other words, if all the particles are the same exact size, then hexagonally close packing may be the most efficient way to make use of the volume. However, in one embodiment, it may be possible to use an even higher volume fraction of the membrane if particles of multiple sizes and/or of different shapes are used. The volume fraction of solid electrolyte particles may then be further increased by removing an increasingly large amount of membrane (via abrasive polishing) on both sides. In this manner, any volume fraction of solid electrolyte particles can be achieved. Creating a membrane with a higher volume fraction of solid electrolyte may require polishing down the membrane film to thinner membranes, thereby removing higher fractions of the initial membrane.

Further, although the solid electrolyte membrane 100 are shown as having spherical solid electrolyte particles, it is to be appreciated that particles of the solid electrolyte 102 do not necessarily need to be spherical. For example, the particles of the solid electrolyte 102 may be donut shaped, blood-cell shaped, and/or any other specifically desired shape (which may be created based on the tuning the spray drying process, specifically the feed rate of the aqueous precursor, to shape the particles). Additionally, particles of the solid electrolyte 102 can be prepared by preparing a precursor solution and regular drying, followed by sintering, yielding non-spherical particles. Ball milling can then be used to reduce the particle size.

To maximize kinetic flow, it is recommended that an ion traverse a single particle of the solid electrolyte 102. However, the solid electrolyte membrane 100 may include multiple layers of the solid electrolyte 102, which may cause an ion to traverse or hop from one particle of the solid electrolyte 102 to another particle of the solid electrolyte 102. Having multiple layers of the solid electrolyte 102 may allow for more uniform distribution of particles within the matrix.

Additionally, multiple membranes (such as the solid electrolyte membrane 100 and another of the solid electrolyte membrane 100) can be stacked together to make a thicker membrane (which may be used for ion selectivity, kinetic flow, greater filtering capability, etc.). In such an embodiment, the individual layers of more than one membranes can be joined together with a Li+ (or whatever alkali metal ion selected) conductive adhesive, such as a matrix containing polyethylene glycol diglycidyl ether (PEG-DGE) and/or Jeffamine D-230, and a lithium, salt such as LiTFSI. Of course, it is to be appreciated that other Li+ conductive adhesives may be used to enable the fabrication of a multilayered membrane.

In one embodiment, rather than using mechanical polishing, laser ablation and/or chemical etching may be used to shave down the surfaces of the solid electrolyte membrane 100 and expose the particles of the solid electrolyte 102 to the surfaces. Additionally, ion milling or focused ion beams (FIB) may be used to polish the surface.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
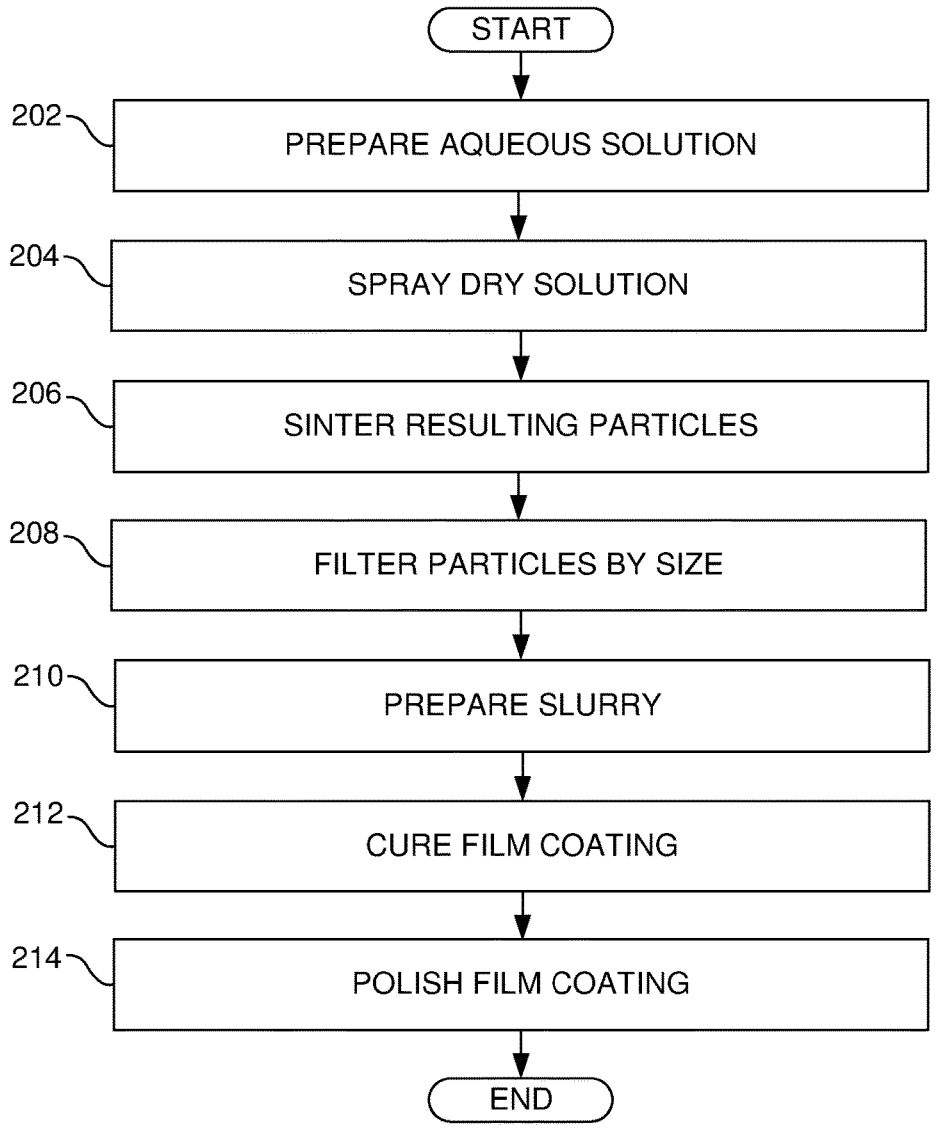
FIG. 2 illustrates a method for creating a solid electrolyte membrane, in accordance with one embodiment.

FIG. 2 illustrates a method 200 for creating a solid electrolyte membrane, in accordance with one embodiment. As an option, the method 200 may be implemented in the context of any one or more of the embodiments set forth in any previous and/or subsequent figure(s) and/or description thereof. Of course, however, the method 200 may be implemented in the context of any desired environment. Further, the aforementioned definitions may equally apply to the description below.

As shown, individual particles of the solid electrolyte of choice are prepared (step 202). In one embodiment, in the case of using LiSICON as the solid electrolyte material, an aqueous solution containing a precursor (Li2CO3, LiNO3, Al2O3, TiO2, GeO2, NH4H2PO4) may be spray-dried (step 204) into spherical particles 1 um-1 mm (or even smaller than 1 um) in diameter. It is to be appreciated that the precursors enumerated are not to be construed as only limited thereto. Other precursors may be used that are compatible with the desired and selected solid electrolyte material. Additionally, the particle size may directly influence the resistance for ion transport. For example, a thinner membrane may result in a lower resistance for ion transport. That being said, the membrane may be adjusted such that it is sufficient thick to prevent any appreciable penetration of water (or a feed solution). The resulting particles are then sintered at high temperature (step 206) in order to densify the particles. The temperature and time of sintering may be depend on the selected solid electrolyte material. The densified particles may result in undesired substances (such as water) being prevented from diffusing through the bulk of the aqueous solution, while also homogenizing the distribution of atoms in the particle (which increases Li+ conductivity).

The precursors solution for the solid electrolyte may be composed of salts, inorganic or organic compounds containing the elements of the solid electrolyte. The following tables show possible precursor and candidate materials to result in the solid electrolyte:

TABLE 1

Possible Precursors

| Solid Electrolyte | Precursors |
| --- | --- |
| LATP | $Li_2CO_3$, $Al_2O_3$, $TiO_2$, $NH_4H_2PO_4$ |
| LAGP | $Li_2CO_3$, $Al_2O_3$, $GeO_2$, $NH_4H_2PO_4$ |
| LiSICON | $Li_2CO_3$, $Al_2O_3$, $GeO_2$, $TiO_2$, $NH_4H_2PO_4$ |

TABLE 1-continued

Possible Precursors

| Solid Electrolyte | Precursors |
|---|---|
| LTO | $Li_2CO_3$, $TiO_2$ |
| NaSICON | $Na_2CO_3$, $Al_2O_3$, $GeO_2$, $TiO_2$, $NH_4H_2PO_4$ |

TABLE 2

Candidate Materials for Solid Electrolyte

| | |
|---|---|
| Alkali Metals | |
| Li | $Li_2CO_3$, $LiNO_3$, LiOH, LiOR (R = Alkyl) |
| Na | $Na_2CO_3$, $NaNO_3$, NaOH, NaOR (R = Alkyl) |
| K | $K_2CO_3$, $LiNO_3$, KOH, KOR (R = Alkyl) |
| Tetravalent Metals | |
| Ti | $TiO_2$, $Ti(OR)_4$ (R = Alkyl) |
| Si | $SiO_2$, $Si(OR)_4$ (R = Alkyl) |
| Ge | $GeO_2$, $Ge(OR)_4$ (R = Alkyl) |
| Zr | $ZrO_2$, $Zr(OR)_4$ (R = Alkyl) |
| Phosphorus | |
| P | $H_3PO_4$, $(NH_4)_{3-x}H_xPO_4$ (x = 0, 1, 2) |
| Trivalent Metals | |
| Al | $Al(NO_3)_3$, $Al_2O_3$, $Al(OR)_3$ (R = Alkyl) |
| Cr | $Cr(NO_3)_3$, $Cr_2O_3$, $Cr(OR)_3$ (R = Alkyl) |
| Ga | $Ga(NO_3)_3$, $Ga_2O_3$, $Ga(OR)_3$ (R = Alkyl) |
| Fe | $Fe(NO_3)_3$, $Fe_2O_3$, $Fe(OR)_3$ (R = Alkyl) |
| Sc | $Sc(NO_3)_3$, $Sc_2O_3$, $Sc(OR)_3$ (R = Alkyl) |
| In | $In(NO_3)_3$, $In_2O_3$, $In(OR)_3$ (R = Alkyl) |
| Lu | $Lu(NO_3)_3$, $Lu_2O_3$, $Lu(OR)_3$ (R = Alkyl) |
| Y | $Y(NO_3)_3$, $Y_2O_3$, $Y(OR)_3$ (R = Alkyl) |
| La | $La(NO_3)_3$, $La_2O_3$, $La(OR)_3$ (R = Alkyl) |
| Eu | $Eu(NO_3)_3$, $Eu_2O_3$, $Eu(OR)_3$ (R = Alkyl) | where R=any alkyl substituent, including methyl, ethyl, propyl, butyl, isopropyl, isobutyl groups. Notable precursors include titanium isopropoxide (TTIP) for Ti and tetraethyl orthosilicate (TEOS) for Si.

For the lithium-selective membrane, the solid electrolyte may be composed of any NASICON-type Li+ conductor such as LATP, LAGP, LAGTP, LATP, LTASP, LLZP (L=Li if it is the first letter of the anagram, A=Al, T=Ti, G=Ge, L=La if it is not the first letter of the anagram, Z=Zr, S=Si, P=$PO_4^{3-}$). Of the aforementioned electrolytes in the NASICON-type Li+ conductors, any tetravalent metal may be partially or completely substituted with any other tetravalent metal mentioned in the table above, and any of the trivalent metals (Al) may be partially or completely substituted with any other trivalent metal mentioned in the table above. Additionally, any trivalent or tetravalent metal may be partially or completely removed. Other potential solid electrolyte materials may include lithium iron phosphate (LFP), lithium titanium oxide (LTO). Further, the precursors used may depend on the elements used in the solid electrolyte. Of course, for each element selected, a suitable precursor may be listed in the table provided herein.

Additionally, more than one membrane may be used. For example, as shown in process 800 detailed hereinbelow, a first solid electrolyte membrane may be used to selectively extract lithium from a feed solution, and a second solid electrolyte membrane may be used to transfer ions (such as sodium) from a second electrode into the feed solution (from which the lithium was extracted). In such an embodiment, the second solid electrolyte membrane, the composition may depend on the specific ion to be utilized for the second electrode. For example, in the case of sodium, the solid electrolyte may be composed of any NASICON-type conductor of the form $Na_{1+x}Zr_2Si_xP_{3-x}O_{12}$ (0<x<3). For the aforementioned NASICON-type conductor, any tetravalent metal (Zr, Si) may be partially or completely replaced by any other isovalent metal in the table provided hereinabove. Additionally, the electrolyte may be doped with any trivalent metal in the above table. In the case of potassium, the solid electrolyte can be composed of $K_2Fe_4O_7$. The precursors used may therefore depend on the elements used in the solid electrolyte, where for each element selected, a suitable precursors may be listed in the table provided herein.

Next, the particles may be preferably filtered (step 208) based on size (e.g. using a sieve) to remove the excessively small particles and/or to narrow the size distribution of the batch of particles. Suitable materials for the solid electrolyte materials may include, but not be limited to, NASICON-type Li+ conductors (also known as LiSICON), including LATP/LAGP/LAGTP, as well as lithium titanium oxides (LTO), and lithium iron phosphate (LFP). In general, any material that is water-stable, has Li+ (or whatever alkali metal selected) conductivity of at least $10^{\wedge}-6$ S/cm, and a dense crystal structure that has a high selectivity for Li+ (or whatever ion is desired) over other ions, may be acceptable as a solid electrolyte material.

In one embodiment, the crystal structure of the solid electrolyte may include a tetrahedra structure (such as $ZrO_6$), and/or an octahedra structure (such as $PO_4$, $SiO_4$, etc.). Additionally, using the process disclosed herein, the microparticles may be sized as needed for efficient membrane ion transfer. For example, a microparticle for the solid electrolyte may be sized at or greater than 100 microns (μm) when used in a membrane with a thickness of 100 microns.

Next, a slurry containing the particles, matrix (such as epoxy pre-polymers), and a thickener (such as SBR, PVDF, PEO, and/or pre-cured epoxy, etc.) is casted onto a substrate (step 210) to form a dense coating in which the particles may be embedded in a matrix. In one embodiment, the pre-polymers may function also as a thickener. Additionally, the substrate may include but not be limited to: fluorinated ethylene propylene (FEP), polytetrafluoroethane (PTFE), silicone, polyethylene (PE), polypropylene, kapton, polyethylene terephthalate (PET), etc. Additionally, the substrate may also be composed of one material but coated with one of the aforementioned materials (fluorinated ethylene propylene (FEP), polytetrafluoroethane (PTFE), silicone, polyethylene (PE), polypropylene, kapton, polyethylene terephthalate (PET), etc.) to give the resulting substrate similar or same surface properties enabling delamination of the resulting coating. The film coating is then cured (step 212). As an example, the curing may occur through thermal, and/or UV curing. A result of the curing may include a densely crosslinked matrix.

In various embodiments, suitable materials for the pre-polymers for thermally crosslinked epoxies may include any multifunctional epoxide molecule (Epon828, and/or PEG-DGE, etc.) and amine crosslinkers (melamine, phenylene-diamine, and/or jeffamine D-230, etc.). Suitable materials for UV-cured polymers may include multifunctional acrylates/methacrylates (e.g. PEGDMA, and/or PEGDA, etc.) and photoinitiators (e.g. Darocur 1173). The crosslinked matrix may have a structure that prevents the diffusion of any substance (most notably water and gases), as a result of its hydrophobic structure and densely crosslinked nature.

Lastly, the film coating is then polished (step 214), including one or both sides, using an abrasive pad. This could be done on a roll-to-roll operation in which the membrane roll with the film coating may be passed through a series of abrasive pads that rotate/slide in order to grind down the surfaces of the membrane, thereby removing the outermost regions of the membrane. After polishing, individual solid electrolyte particles embedded in the membrane may each have large areas of exposed surfaces on both sides of the membrane, providing a route for Li+ ions (or any membrane specific ion) to completely traverse the membrane without the need to travel through multiple particles.

The membrane as discussed herein can be fabricated using web coaters. With respect to scalability of production of such a membrane, as increased battery manufacturing capability comes online to meet growing demand, a single conventional roll-to-roll coater (having a footprint small enough to fit in an office cubicle) can produce enough membrane (such as the solid electrolyte membrane 100) to match each additional 2 GWH of lithium battery manufacturing capacity. Additional web coaters can be added to operate in parallel (as lithium battery manufacturing capacity continues to increase with time). Moreover, these web coaters can be collocated near the battery factory. In this manner, production of the solid electrolyte is space-efficient and scalable, and can satisfy expected industry demands.

Figure 3:
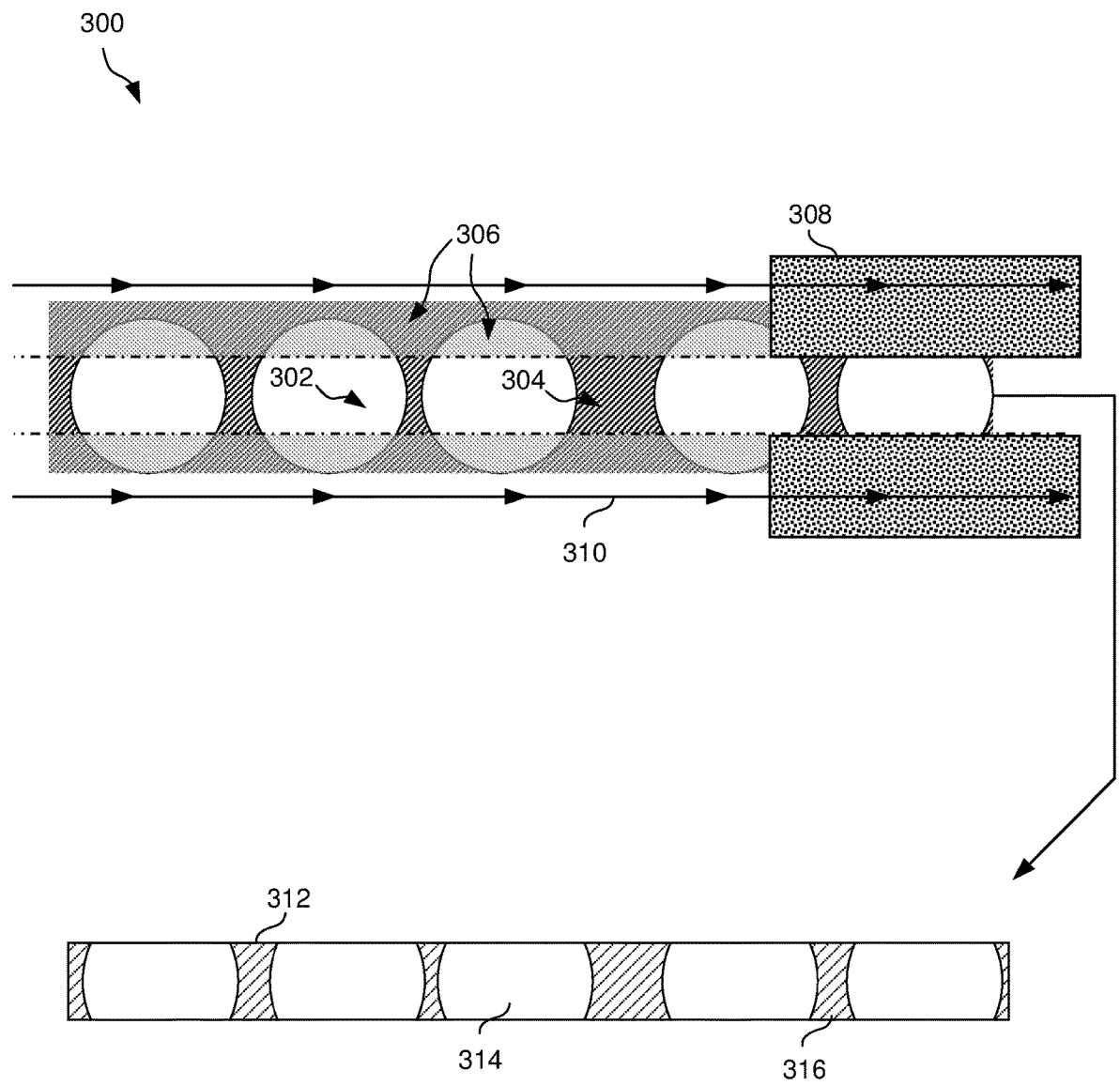
FIG. 3 illustrates a process for mechanical polishing the solid electrolyte membrane, in accordance with one embodiment.

FIG. 3 illustrates a process 300 for mechanical polishing the solid electrolyte membrane, in accordance with one embodiment. As an option, the process 300 may be implemented in the context of any one or more of the embodiments set forth in any previous and/or subsequent figure(s) and/or description thereof. Of course, however, the process 300 may be implemented in the context of any desired environment. Further, the aforementioned definitions may equally apply to the description below.

As shown, the solid electrolyte 302 is embedded within a matrix 304. Mechanical polishers 308 may be used to polish one or more surfaces of the membrane film (containing both the solid electrolyte 302 and the matrix 304). In various embodiments, the solid electrolyte 302 may extend to a surface of the membrane film. In other embodiments, the matrix 304 may extend to a surface of the membrane film. In either case, additional material 306 (either of the solid electrolyte 302 and/or the matrix 304) may be present within the membrane film. In various embodiments, the polishing may occur one side at a time (in series), or both sides simultaneously (assuming both sides polished is desired). Additionally, in one embodiment, a first side may be polished, the coating may then be removed from the release film and transferred to the surface of the electrode (active material coating), where the polished side faces the active material coating, then the resulting laminate is polished once again to expose the solid electrolyte particles on the remaining side.

The membrane film may be polished by passing 310 the membrane film through one or more series of abrasive pads that rotate/slide in order to grind down the surfaces of the membrane film, thereby removing the outermost regions of the membrane film.

After polishing one or more surfaces of the membrane film, polished membrane 312 includes a first exposed surface 314 of the solid electrolyte and a second exposed surface 316 of the matrix. As such, individual solid electrolyte particles embedded in the membrane film may each have large areas of exposed surfaces on both sides of the membrane, providing a route for Li+ ions to completely traverse the membrane without the need to travel through multiple particles.

Figure 4:
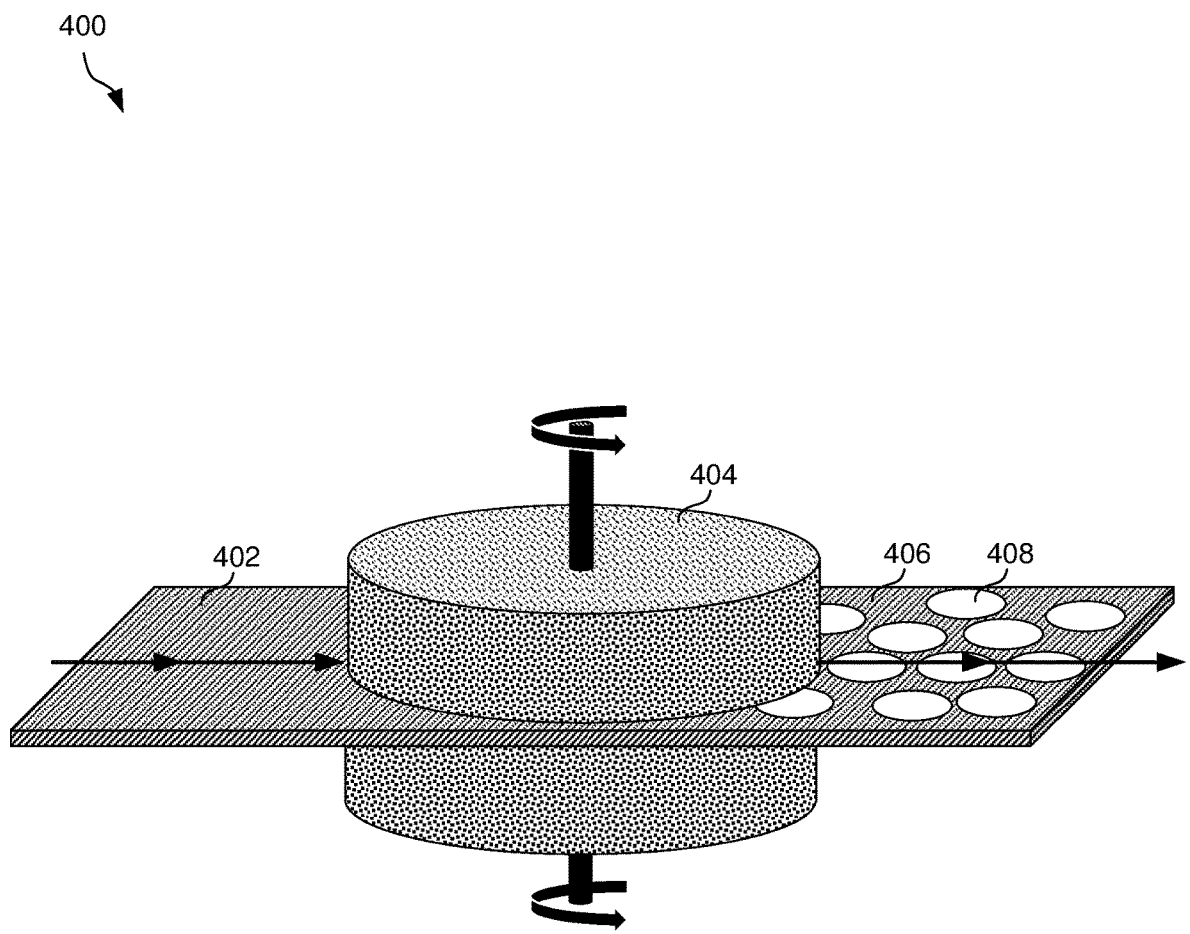
FIG. 4 illustrates a roll-to-roll process for mechanical polishing the solid electrolyte membrane, in accordance with one embodiment.

FIG. 4 illustrates a roll-to-roll process 400 for mechanical polishing the solid electrolyte membrane, in accordance with one embodiment. As an option, the roll-to-roll process 400 may be implemented in the context of any one or more of the embodiments set forth in any previous and/or subsequent figure(s) and/or description thereof. Of course, however, the roll-to-roll process 400 may be implemented in the context of any desired environment. Further, the aforementioned definitions may equally apply to the description below.

As shown, a membrane film 402 may be polished on one or more sides (shown as polishing on both sides in the roll-to-roll process 400) using a mechanical polisher 404 (such as an abrasive pad). The roll-to-roll process 400 shows a roll-to-roll operation in which the membrane film 402 roll is passed through a series of mechanical polishers 404 that rotate/slide in order to grind down the surfaces of the membrane film 402, thereby removing the outermost regions of the membrane film 402. After passing through the mechanical polishers 404, a first exposed surface of the matrix 406 and a second exposed surface of the solid electrolyte 408 may be shown.

Figure 5:
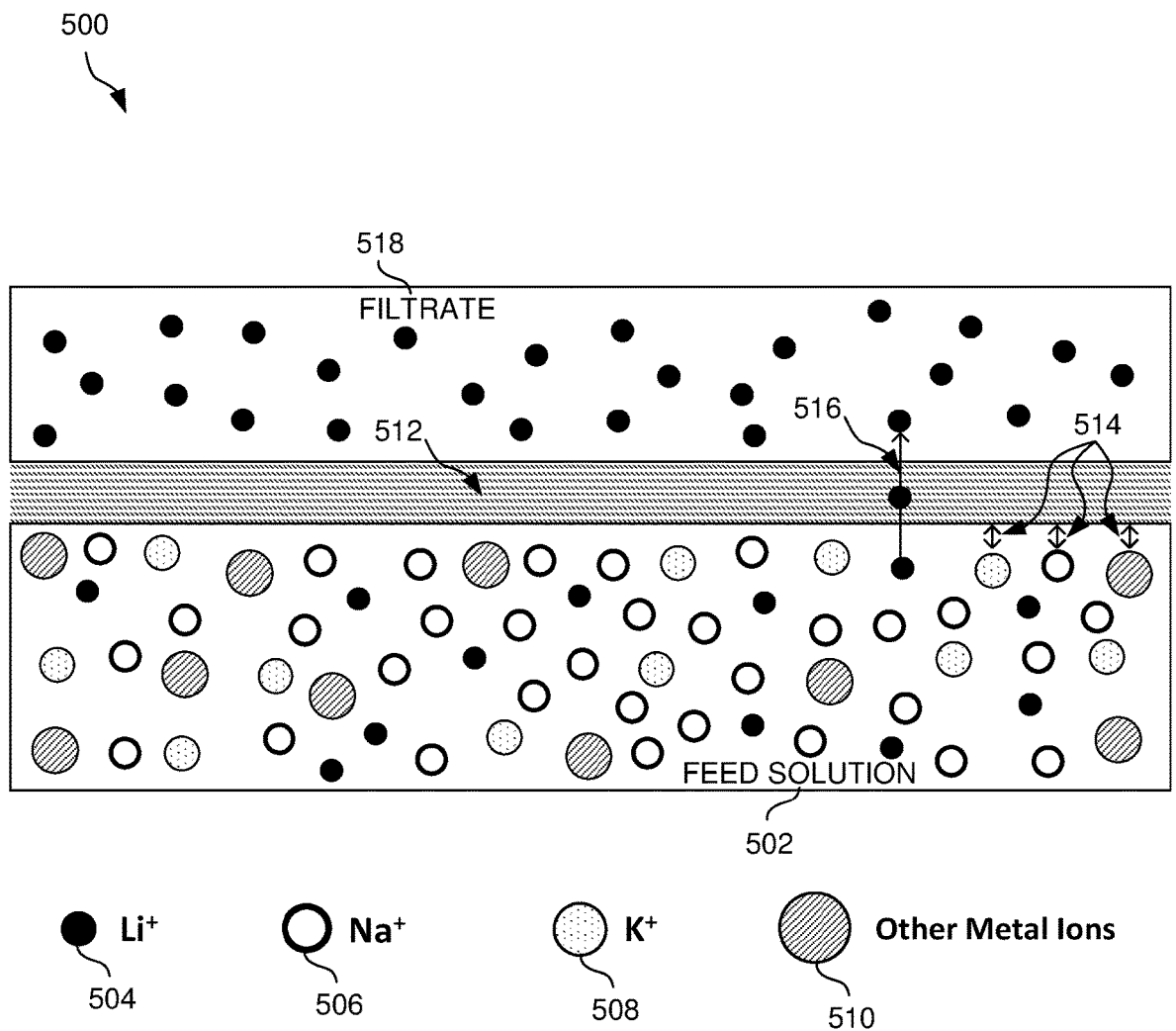
FIG. 5 illustrates an ion-selective solid electrolyte membrane, in accordance with one embodiment.

FIG. 5 illustrates an ion-selective solid electrolyte membrane 500, in accordance with one embodiment. As an option, the ion-selective solid electrolyte membrane 500 may be implemented in the context of any one or more of the embodiments set forth in any previous and/or subsequent figure(s) and/or description thereof. Of course, however, the ion-selective solid electrolyte membrane 500 may be implemented in the context of any desired environment. Further, the aforementioned definitions may equally apply to the description below.

As shown, the ion-selective solid electrolyte membrane 500 includes a feed solution 502, which may include a collection of many different types of ions, including but not limited to lithium $Li^+$ 504, sodium $Na^+$ 506, potassium $K^+$, and/or other metal ions 510. The feed solution 502 may additionally include any aqueous solution containing one or more of lithium $Li^+$ 504, sodium $Na^+$ 506, potassium $K^+$, and/or other metal ions 510.

Additionally, a membrane 512 may be used to selectively allow an ion, in this exemplified case, lithium $Li^+$ 504, to pass 516 through the membrane 512. In contrast, the membrane 512 may be used to prevent other ions, in this exemplified case, sodium $Na^+$ 506, potassium $K^+$, and/or other metal ions 510, from passing 514 through the membrane 512. The accumulated ions that pass through the membrane 512 may be found in the filtrate 518.

It is to be appreciated that world demands for lithium continues to increase (especially as demands for electrification of vehicles increase). Using the ion-selective solid electrolyte membrane 500 may allow for extraction of lithium from lithium minerals, as well as from otherwise unused or discarded sources, including but not limited to recycled lithium batteries, and even seawater (especially as seawater contains >99% of the Earth's accessible Li supply). Current systems (such as from Li brines and/or Li minerals) fail to recover lithium (and other alkali metals) from unconventional sources, and/or are problematic (in terms of selectivity, durability, and/or scalability).

Figure 6:
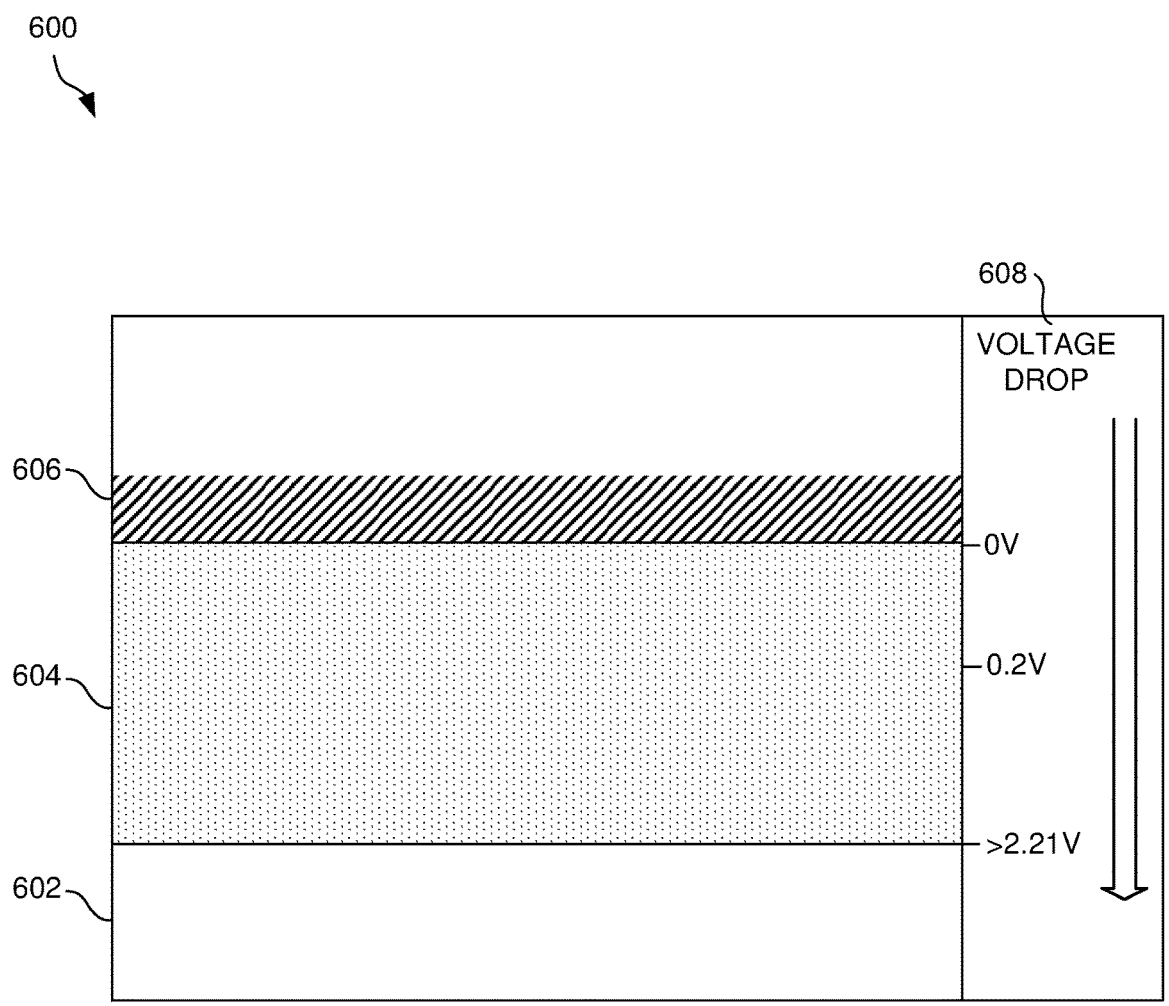
FIG. 6 illustrates a voltage drop using a carbon-based membrane, in accordance with one embodiment.

FIG. 6 illustrates voltage drop 600 using a carbon-based membrane, in accordance with one embodiment. As an option, the voltage drop 600 may be implemented in the context of any one or more of the embodiments set forth in any previous and/or subsequent figure(s) and/or description thereof. Of course, however, the voltage drop 600 may be implemented in the context of any desired environment. Further, the aforementioned definitions may equally apply to the description below.

As shown, the voltage drop 600 may occur using a membrane 604. For example, the membrane 604 may be in contact with a feed solution 602 and an electrode 606. As ions pass through the membrane 604, they may experience a voltage drop 608. In various embodiments, the membrane 604 may be carbon-based (without solid electrolyte particles). In this particular embodiment, carbon-based particles may carry lithium ions through capacitive adsorption rather than through the intrinsic crystal structure of the material (as is the case with solid electrolyte particles). It is to be understood, however, that the voltage drop 600 may occur for any type of membrane used (whether it be carbon-based or solid electrolyte particles).

In one particular embodiment (and as an alternative to the membrane 604), the separation membrane may include multiple layers of graphitic carbon. For example a capacitor-like carbon-based membrane may interface and be in contact with the feed solution 602. Additionally, a graphitic carbon membrane may be a second layer within the membrane. It is to be appreciated that any number of layers of graphitic carbon may be used. Based on interaction with the graphitic carbon, the ions that pass through the capacitor-like carbon-based membrane and the graphitic carbon membrane may accumulate as solid metal (such as metallic lithium Li). Further, ions may accumulate at the electrode 606 (which may include but not be limited to graphite). The electrode 606 may be made of low-porosity graphite, prepared via high-temperature sintering of carbonaceous precursors (e.g. polymers such as polyacrylonitrile (PAN)) over prolonged periods of time.

In one embodiment, the membrane 604 and/or the multilayer membrane of graphitic carbon may be configured to selectively extract lithium ions (and/or any preconfigured alkali metal ion) from a precursor/feed solution containing an abundance of the selected ion and other ions. This precursor/feed solution may include lithium-rich brines, an aqueous solution of ions produced upon acid leaching of lithium minerals, an aqueous solution of ions produced via dissolution (with or without acid) of a discarded/recycled battery, sea water, and/or any other aqueous solution containing the desired ions to be extracted.

With respect to the multilayer membrane of graphitic carbon, it may consist of multiple layers (such as the capacitor-like carbon-based membrane, the graphitic carbon membrane, etc.) each composed of various types of carbon.

Additionally, with respect to the graphitic carbon membrane of the multilayer membrane of graphitic carbon, it may be composed of graphitic carbons bound together with a matrix (including polymeric binders such as polyvinylidene fluoride (PVDF), epoxy) and/or compression plates. With respect to the capacitor-like carbon-based membrane, it may be another membrane layer composed of carbon particles bound together via polymeric binders or compression plates (similar to the graphitic carbon membrane).

In one embodiment, regardless of whether the membrane 604 or the multilayer membrane of graphitic carbon is used, as the alkali metal (such as lithium) travels through the membrane, the alkali metal may be electrochemically reduced to its metallic state (such as Li). Additionally, with respect to the membrane 604, the alkali metal may be reduced to its metallic state. As such, an active material (such as graphite) may be chosen with a reduction potential close to that of metallic alkali metal (such as Li), such that the membrane may be in direct electrical contact with the active material, and the current density may be high enough (or the active material may be overcharged) to initiate formation of metallic alkali metal (Li). Further, the cell design may include a separator between the active material coating and the membrane 604 to prevent direct electrical contact. Additionally, if it were desired to plate metallic Li, an electrode could be created with no active material (such that metallic Li may directly plate on the current collector or any electronically-conductive surface in the electrode), and/or the active material may be overcharged such that all available sites for Li insertion into the active material may be occupied (leading to plating of metallic Li upon further charging). It is to be understood that although reduction to a metallic state is feasible, the system may be set to prioritize energy efficiency (which in turn may require low current density demands to reduce energy loss due to ohmic resistance). As such, the system may be modified to prioritize desired outcomes (such as, but not limited to, energy efficiency, metallic reduction, etc.).

In one embodiment, the voltage drop may relate to the stability of the membrane 604 with respect to water. With respect to this particular application, the voltage drop may be either ionic or electronic in nature. Additionally, if the voltage drop were electronic, that may allow for safe operation of the membrane 604 in contact with water.

In this manner, the feed solution 602 may function as an electrolyte, and the electrode 606 may function as an anode. Such phenomenon is illustrated by voltage drop 608. The voltage drop may be due to Ohmic resistance as described by V=IR. The resistance R of the membrane layer(s) may be fixed based on the design, but the voltage drop V varies with the current I that is applied. Since the intercalation of lithium ions into graphite (lithiation) occurs at reduction potentials well below the reduction potential of water, a voltage drop may be necessary in order to prevent the current from reducing water (which would significantly reduce the efficiency of the design). Since the difference in reduction potential of lithium metal and water is 2.21 V, in one embodiment, the membrane may operate at a current I such that the electrons experience a voltage drop of at least 2.21 V as to not reduce water.

As shown later (in FIG. 7), individual sheets of graphene within the carbon particles (of either or both of the capacitor-like carbon-based membrane and the graphitic carbon membrane of the multilayer membrane of graphitic carbon) may be covalently adhered to one another (as opposed to van der Waals forces). This covalent bond may significantly increase the amount of energy required to push apart the lattices (e.g. it is intolerable to strain). Thus, the sizing of the distance between the sheets of graphene may be tuned to the particular size ion that should pass through the membrane.

In operation, the graphitic carbon particles of the multilayer membrane of graphitic carbon (in either or both of the capacitor-like carbon-based membrane and the graphitic carbon membrane) may extract ions from the feed solution 602 via electrochemical intercalation/adsorption. Since electrochemical intercalation of Li requires the lowest strain (10 vol %) among all ions that are likely to be found in the feed solution 602, the selectivity of Li will be highest. Additionally, by increasing the degree of covalent C—C bonds between adjacent sheets of graphene, the selectivity of Li over other ions is even further enhanced, as a substantial amount of strain would be required for other ions to intercalate. In this manner, an effective voltage drop may occur as the selected ion (such as Li+) passes through the capacitor-like membrane and the graphitic carbon membrane of the multilayer membrane of graphitic carbon. In similar manner, as the selected ion (such as Li+) passes through the membrane 604, it may also experience an effective voltage drop.

In one embodiment, the carbon particles contained in the capacitor-like carbon-based membrane of the multilayer membrane of graphitic carbon may serve multiple purposes. For example, they may serve as an electrical buffer layer between the graphitic carbon membrane and the feed solution 602 (which is likely to be an aqueous solution). Additionally, the carbon particles may extract ions from the feed solution 602 and transport such ions to the graphitic carbon membrane of the multilayer membrane of graphitic carbon.

Additionally, the electrochemical buffering effect may be achieved via the hydrophobic nature of the materials (such as carbon) in the capacitor-like carbon-based membrane, and by a large electrochemical voltage drop across the capacitor-like carbon-based membrane. Such voltage drop 608 may prevent the reduction of water at the interface between the feed solution 602 and the capacitor-like carbon-based membrane of the multilayer membrane of graphitic carbon. This voltage drop is achieved by tuning the thickness and resistivity of the membrane, as governed by Ohm's law (V=IR, where R=(resistivity)*(thickness/area).

As such, alkali metal ions may be extracted via electrochemical and capacitive adsorption of ions on the surface of the carbon particles. By tuning the porosity and surface area of the carbon particles, the kinetics of ion transport can be tuned. Though all ions are possible to adsorb onto the carbon particles, lighter ions and monovalent ions (e.g. alkali metal ions) can move much more rapidly through the membrane 604 (to the electrode 606).

In various embodiments, the design of the membrane 604 can be modified such that the alkali ion (such as lithium) does not fully reduce all the way to its metallic state (such as metallic Li) and/or plate on the surface of the electrode 606.

In one embodiment, reducing the alkali ion to its metallic stage may be limited by making the graphitic carbon membrane substantially larger (in terms of thickness of layer) such that the alkali metal (such as lithium) extracted may be completely contained within the graphitic carbon membrane (and subsequently removed).

In like manner, using the membrane 604 may allow for recovery of the electrical energy used to drive this reaction, reducing the net energy requirement and therefore cost of the material. In other words, energy used to drive the displacement of alkali metals (from a feed solution) to an electrode may, in turn, be stored in the form of electrochemical energy, which may discharged at a later time.

Figure 7:
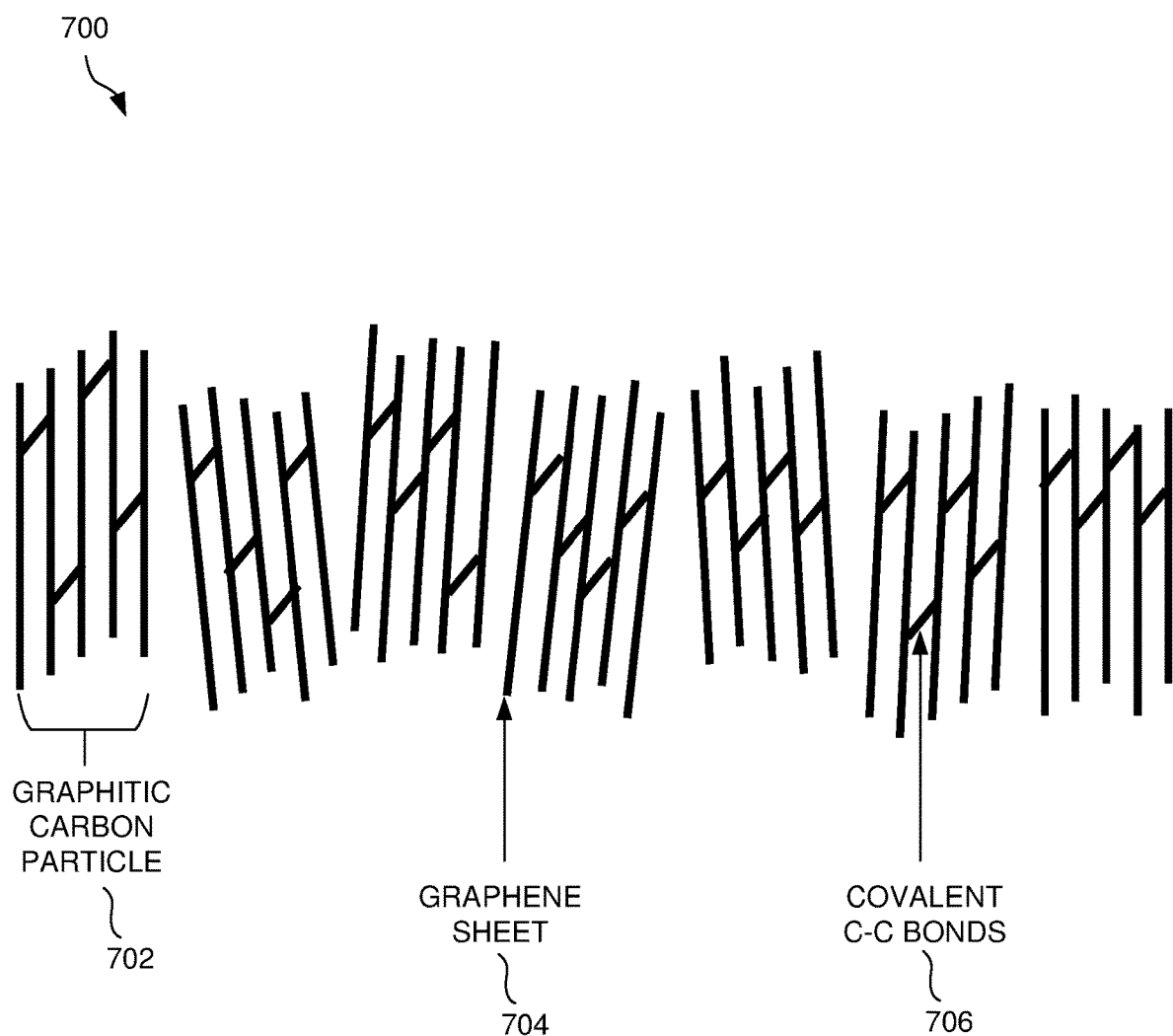
FIG. 7 illustrates a close-up diagram of graphitic carbon, in accordance with one embodiment.

FIG. 7 illustrates a close-up diagram 700 of graphitic carbon, in accordance with one embodiment. As an option, the close-up diagram 700 may be implemented in the context of any one or more of the embodiments set forth in any previous and/or subsequent figure(s) and/or description thereof. Of course, however, the close-up diagram 700 may be implemented in the context of any desired environment. Further, the aforementioned definitions may equally apply to the description below.

As shown, the close up diagram 700 of graphitic carbon includes a graphitic carbon particle 702. Additionally, such graphitic carbon particle 702 (collectively) may include individual graphene sheets 704, where a covalent carbon-carbon bond 706 links the individual graphene sheets 704 together.

In one embodiment, the graphitic carbon membrane 606 described hereinabove may be tuned such that the surface area (of the graphitic carbon particle 702) may be minimized, and the interplanar fusion (e.g. covalent C—C bonds between adjacent sheets of graphene in the lattices) may be maximized.

By decreasing the surface area of the graphitic carbon particle 702, the amount of ions that can be held on the surface of the carbon particles may be greatly decreased, minimizing the amount of undesired ions extracted from the membrane.

Figure 8:
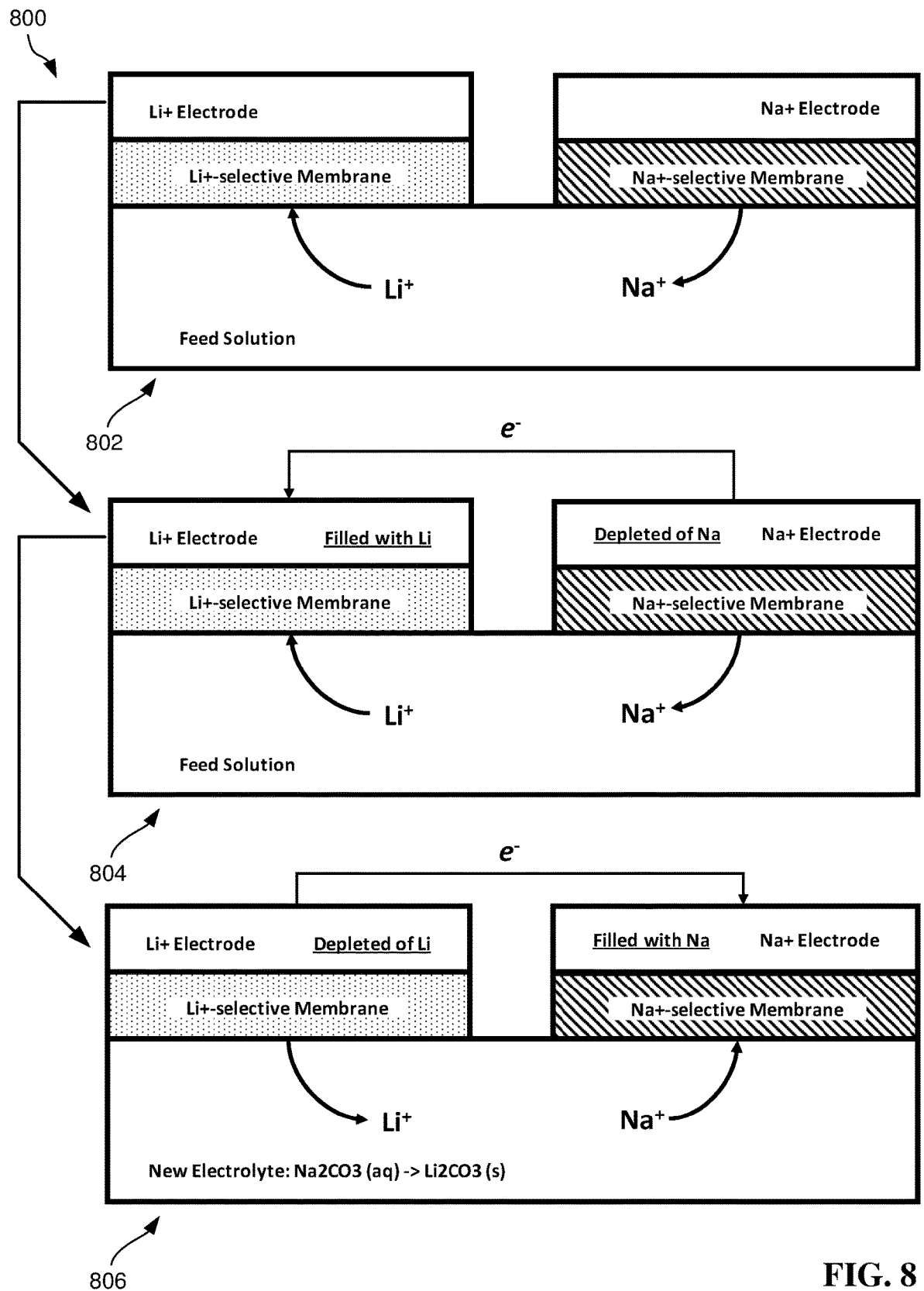
FIG. 8 illustrates a process for recovering energy from lithium extraction, in accordance with one embodiment.

FIG. 8 illustrates a process 800 for recovering energy from lithium extraction, in accordance with one embodiment. As an option, the process 800 may be implemented in the context of any one or more of the embodiments set forth in any previous and/or subsequent figure(s) and/or description thereof. Of course, however, the process 800 may be implemented in the context of any desired environment. Further, the aforementioned definitions may equally apply to the description below.

As shown, step 802 shows lithium present in a feed solution. Two membranes may be interfaced with the feed solution, a first membrane as a lithium selective membrane (consistent with use of the solid electrolyte 102 embedded in the matrix 104 disclosed herein), and a second membrane as a sodium selective membrane. In one embodiment, the sodium selective membrane may use a solid electrolyte embedded in a matrix (similar to the first membrane), but tuned to the particular ion (such as sodium). The first membrane may interface with an electrode, and the second membrane may interface with a second electrode (in other words, a separate electrode for each of the lithium ions and the sodium ions). It is to be appreciated that although lithium and sodium are used in the context of the process 800, the solid electrolyte may be tuned for separation of any particular ion, as disclosed hereinabove. Further, although sodium is shown, any ion which is less reducing than lithium (or the ion to be extracted) may be used.

At step 804, a voltage is applied to the process 800 which, in turn, may cause the lithium ions to transfer from the feed solution to the lithium electrode via the lithium selective membrane. As lithium is removed from the feed solution, sodium ions may be depleted from the sodium electrode (and transfer to the feed solution). Once the lithium ions are stored in the lithium electrode, the energy inputted (to cause the lithium ions to transfer to the lithium electrode) may be stored in the form of electrochemical energy.

At step 806, the feed solution may be changed to a new electrolyte (to such as Na2CO3), and lithium ions stored at the lithium electrode may transfer back to the new electrolyte (which in turn may then form Li2CO3). Sodium ions that were in the new electrolyte may transfer from the new electrolyte to the sodium electrode (via the sodium selective membrane).

The electrochemical energy (stored via the lithium ions on the lithium electrode) may be released with the transfer of the lithium ions from the lithium electrode to the new feed solution (the new electrolyte). In one embodiment, the energy released through the transfer may be stored via any conventional system (such as an external battery, etc.). Such released energy may then be used to drive the process 800 again to extract the ions, which after extraction, the energy may be reclaimed (to drive future extraction of lithium ions). In this manner, once the process 800 is initially established (such that the initial extraction is achieved), energy may be reclaimed, and in turn, used to drive future extraction/separation.

By way of greater detail, the energy required for extraction of lithium from the feed solution into the lithium electrode and for expulsion of lithium from the lithium electrode to the new electrolyte (the final solution) may be dependent on the current density, where a higher current density corresponds with a higher energy need to overcome energy dissipation through ohmic resistance, and the difference in reduction potentials of the electrodes used for the two electrodes (shown as the lithium electrode and the sodium electrode). If the active material for the lithium electrode has a lower reduction potential than the active material for the opposite electrode (shown as the sodium electrode), an input of energy may be required to extract lithium ions from the feed solution (corresponding to the expulsion of the second ion from the opposite electrode, again, shown as the sodium ion from the sodium electrode), which can be recovered when subsequently expelling the lithium from the lithium electrode to the new electrolyte, which may correspond with the extraction of the second ion (shown as sodium) from the new electrolyte to the sodium electrode. If the active material for the lithium electrode has a higher reduction potential than the active material for the opposite electrode (shown as sodium electrode), an input of energy may be required to expel lithium ions from the feed solution (corresponding to the expulsion of the second ion from the opposite electrode), which can be recovered when subsequently extracting lithium from the lithium electrode.

Figure 9:
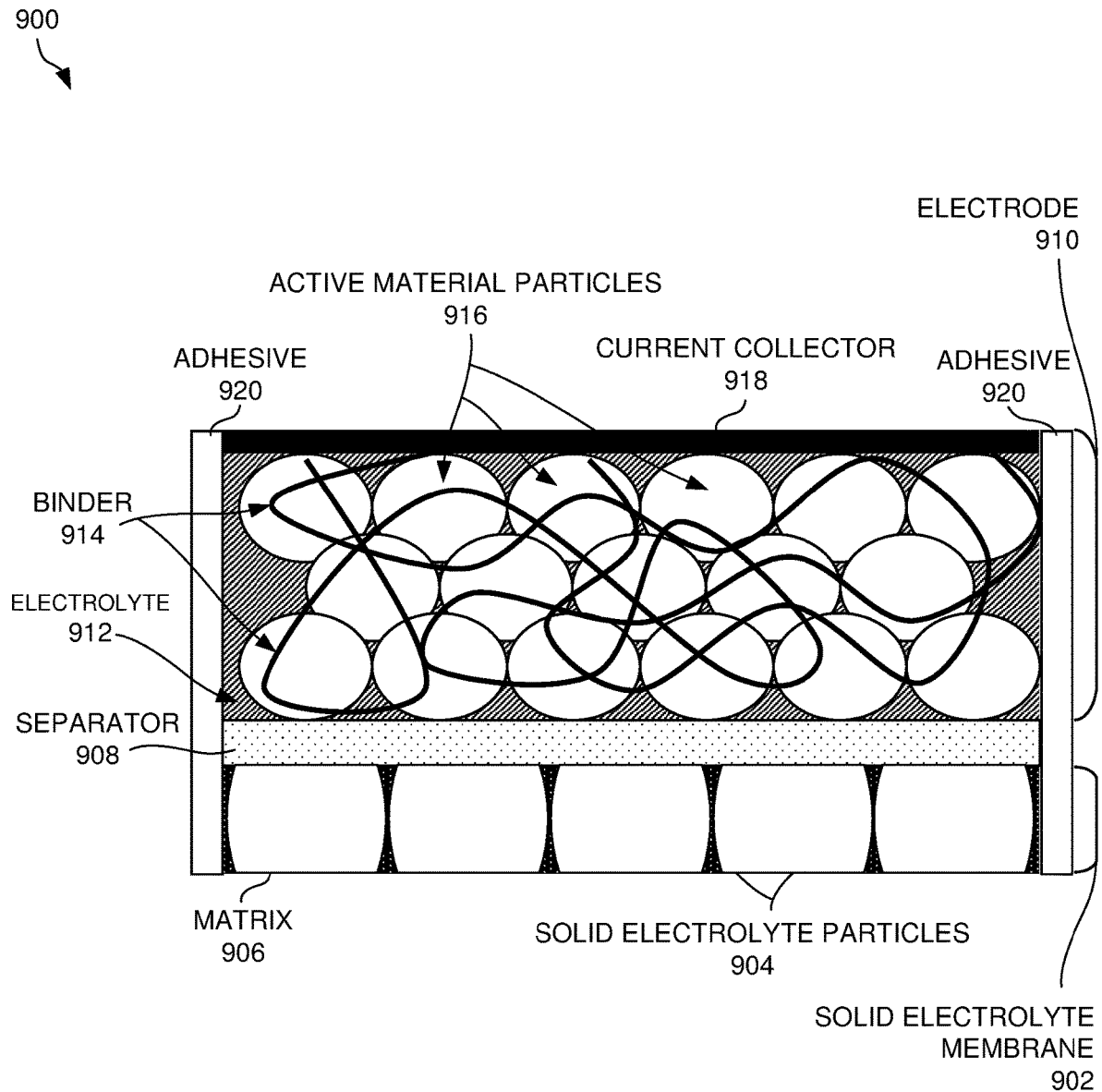
FIG. 9 illustrates a cell architecture, in accordance with one embodiment.

FIG. 9 illustrates a cell architecture 900, in accordance with one embodiment. As an option, the cell architecture 900 may be implemented in the context of any one or more of the embodiments set forth in any previous and/or subsequent figure(s) and/or description thereof. Of course, however, the cell architecture 900 may be implemented in the context of any desired environment. Further, the aforementioned definitions may equally apply to the description below.

As shown, the cell architecture 900 may include a solid electrolyte membrane 902, which in turn, may comprise solid electrolyte particles 904 embedded in a matrix 906. The solid electrolyte membrane 902 may be separated from the electrode 910 via the separator 908. The electrode 910 may comprise an electrolyte 912, a binder(s) 914, active material particles 916, and a current collector 918. An adhesive 920 may line the entirety (on both sides) of the solid electrolyte membrane 902, the separator 908, and the electrode 910.

With respect to the electrode 910, the current collector 918 may serve as an electronically conductive substrate for transferring electricity on which the active material coating is bound on. Additionally, the current collector may be one of the following (but not limited thereto): copper, aluminum, stainless steel, nickel, titanium, graphene.

The active material particles 916 may be the location where alkali metal ions and electrochemical energy are stored. Additionally, the active material particles 916 may serve as a host for the extracted lithium ions and store the energy input for extraction in the form of electrochemical energy.

In various embodiments, suitable electrode materials for a lithium electrode may include, but not be limited to, carbon-based materials (graphite, carbon nanotubes (CNT), graphene, carbon nano onions (CNO), hard carbons), lithium intercalation materials such as lithium titanium oxide (LTO), lithium manganese oxide (LMO), lithium iron phosphate (LFP), lithium manganese phosphate, lithium cobalt phosphate, lithium cobalt oxide (LCO), lithium nickel oxide, lithium nickel manganese cobalt oxide (NMC), lithium nickel cobalt aluminum oxide (NCA), lithium titanium sulfide, lithium vanadium phosphate (LVP), lithium iron sulfate fluoride (LFPF), lithium conversion materials such as halides of the form MXx, where M can be Fe, Co, Ni, Bi, Cu, Ag, and X can be F, Cl, Br, or I, lithium chalcogenides such as S, Se, Te, metals and metalloids that alloy with lithium such as Si, Sn, Ge, Ga, Mg, Al, Zn, In, Au, Ag, Pt, other nonmetals in the group of iodine or oxygen, or lithium metal.

With respect to a sodium electrode (or a less reducing element compared to the ion to be extracted), it may be composed of an active material which may serve as a host for the sodium ion (or whatever ion is selected). In the case of Na+ or K+, the active material may be composed of $Fe_4[Fe(CN)_6]_3$ (Prussian blue), Prussian blue analogues of the form $M1_x[M2_y(CN)_6]_3$, where M1 and M2 is a metal in the group of Fe, Ni, Cu, Mn, Co, Ti, Cr, Zn, carbon-based materials (graphite, carbon nanotubes (CNT), graphene, carbon nano onions (CNO), hard carbons). In the case of Na+, the active materials may also include materials alloying with sodium such as P, K, or sodium metal. In the case of K+, the active materials may also include materials alloying with potassium such as Na, or potassium metal.

In one embodiment, the active material particles 916 may also store ions via capacitive/pseudocapacitive mechanisms, such as graphene, carbon nanotubes (CNT), carbon nano onions (CNO), Mxenes, metal oxides, such as ZnO, $TiO_2$, $SnO_2$, $RuO_2$, $Co_3O_4$, $MnO_2$, NiO, $NiCo_2O_4$, $Fe_3O_4$, $Fe_2O_3$, and $V_2O_5$.

The binder 914 may adhere the active material particles 916 to the current collector 918 while providing cohesion among active material particles and other additives. The binder 914 may include one or more of the following (but not be limited thereto): poly(vinylidene fluoride) (PVDF), carboxymethylcellulose (CMC), styrene-butadiene rubber (SBR).

The electrolyte 912 may serve as a medium for transporting alkali metal ions to and from the active material (including the active material particles 916) and solid electrolyte membrane 902. The electrolyte may contain one or more salts dissolved in a solvent system of one or more components. The salt may contain one or more of any of the following cations: H+, Li+, Na+, K+, Cs+; and one or more of any of the following anions: Cl—, Br—, I—, $NO_3$-, $SO_4$2-, $PO_4$3-, $PF_6$-, TFSI-, FSI—, OTf-, $ClO_4$-. The solvent may be one or more of the following: Water, dimethoxyethane (DME), dioxolane (DOL), tetrahydrofuran (THF), dimethyl carbonate (DMC), propylene carbonate (PC), ethylene carbonate (EC), ethyl methyl carbonate (EMC).

Still yet, the separator 908 may optionally serve as a reservoir for the electrolyte 912 and as an electronically insulating barrier between the active material (such as the active material particles 916) and the solid electrolyte membrane 902.

The adhesive 920 may surround the edges of the electrode 910, and may serve as an impermeable barrier between the inside and outside of the electrode 910. The adhesive may be composed of (but not be limited thereto) epoxy, polyurethanes, polyimides, cyanoacrylates, or acrylic adhesives cured via thermal or UV curing.

Still yet, a second electrolyte (including liquid) may be used in the electrode 910. The edges of the electrode 910 may be protected (edge sealant, glue sealant, etc.) to prevent a feed solution from reaching the active material (such as the active material particles 916) through these exposed areas.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for reclaiming energy, the method comprising:
    transporting lithium ions from a feed solution to a first electrode through a first membrane comprising a first solid electrolyte embedded in a first matrix,
    wherein:
        the transporting of the lithium ions from the feed solution to the first electrode requires an input of energy,
        the first solid electrolyte is configured to extract the lithium ions, and
        the feed solution is a separate input source from a first electrolyte solution associated with the first electrode;
    transporting second ions from a second electrode to the feed solution through a second membrane comprising a second solid electrolyte embedded in a second matrix, wherein the transporting of the second ions from the second electrode to the feed solution coincides with the transporting of the lithium ions from the feed solution to the first electrode; and
    transporting the lithium ions from the first electrode to a second electrolyte solution through the first membrane, wherein the transporting of the lithium ions from the first electrode to the second electrolyte solution recovers at least a portion of the input of energy.

2. The method of claim 1, wherein the input of energy is stored as electrochemical energy of the lithium ions stored in the first electrode, and recovering the at least a portion of the input of energy reduces a carbon footprint of a manufacturing facility.

3. The method of claim 1, wherein the feed solution is based on at least one of lithium minerals, lithium-containing brines, recycled lithium batteries, or seawater.

4. The method of claim 1, wherein the voltage drop is proportional to a thickness of at least one of the first membrane or the second membrane, or to the ohmic resistance of at least one of the first membrane or the second membrane.

5. The method of claim 1, wherein each of the lithium ions passes through a single particle of the first solid electrolyte of the first membrane.

6. The method of claim 1, wherein:
    the first membrane and the second membrane are each water impermeable;
    the first membrane is ion-selective for the lithium ions;
    second membrane is ion-selective for the second ions; and
    the second ions includes at least one of sodium, potassium, or hydrogen.

7. The method of claim 1, wherein transporting the lithium ions from the first electrode into the second electrolyte solution through the first solid electrolyte coincides with an uptake of the second ions from the second electrolyte solution into the second electrode through the second solid electrolyte.

8. The method of claim 1, wherein the first solid electrolyte is at least one of: LATP, LZP, LAGP, LiSICON, or LTO; and the second solid electrolyte is at least one of NaSICON or $K_2Fe_4O_7$.

9. The method of claim 1, wherein the first membrane serves as an electrical buffer between the first electrode and at least one of the feed solution or the second electrolyte solution; and the second membrane serves as an electrical buffer between the second electrode and at least one of the feed solution or the second electrolyte solution.

10. The method of claim 1, wherein at least one of:
    a diameter of the first solid electrolyte is at least 10 μm (microns);
    a material for the first matrix and the second matrix is the same; or
    a material for the first matrix and the second matrix is different.

11. The method of claim 1, wherein at least one of the first electrode or the second electrode comprises a third electrolyte solution, a binder, active material particles, and a current collector.

12. The method of claim 11, wherein the third electrolyte solution is liquid, and one or more sides of the first electrode and the second electrode are lined by an adhesive configured to prevent the feed solution containing the lithium ions from reaching the active material particles of the either of the first electrode or the second electrode.

13. The method of claim 1, wherein a structure of the matrix is densely crosslinked and hydrophobic.

14. The method of claim 1, wherein the molecules of the matrix covalently bond with particles of the first solid electrolyte.

15. The method of claim 1, wherein the first membrane is water impermeable, and the first solid electrolyte is ion-selective for the lithium ions.

16. The method of claim 1, wherein the feed solution is sea water.

17. The method of claim 1, wherein the feed solution is previously used and spent batteries.

18. The method of claim 1, wherein the lithium ions pass through a single particle of the first solid electrolyte of the first membrane.

\* \* \* \* \*